United States Patent
Waddleton

(10) Patent No.: US 7,118,336 B2
(45) Date of Patent: Oct. 10, 2006

(54) PRESSURIZED OIL SUPPLY FOR PROPELLER ENGINE SYSTEM

(75) Inventor: David Waddleton, Candiac (CA)

(73) Assignee: Pratt & Whitney Canada Corp., Longueuil (CA)

( * ) Notice: Subject to any disclaimer, the term of this patent is extended or adjusted under 35 U.S.C. 154(b) by 259 days.

(21) Appl. No.: 10/739,951

(22) Filed: Dec. 19, 2003

(65) Prior Publication Data

US 2005/0135929 A1    Jun. 23, 2005

(51) Int. Cl.
*B64C 11/40* (2006.01)
*B64C 11/42* (2006.01)

(52) U.S. Cl. .............................. 416/1; 416/31; 416/39; 416/42; 416/44; 416/48; 416/157 R; 184/6.4; 184/6.12; 417/79; 417/88; 417/202; 417/286

(58) Field of Classification Search ................... 416/1, 416/25–30, 31, 39, 42, 44, 47, 48, 156, 157 R, 416/157 A; 417/79, 88, 202, 248, 286; 184/6.4, 184/6.12; 60/403, 486
See application file for complete search history.

(56) References Cited

U.S. PATENT DOCUMENTS

| 2,830,668 | A | * | 4/1958  | Gaubis et al. ........ 416/157 R |
| 4,362,467 | A |   | 12/1982 | Elliott |
| 4,523,891 | A |   | 6/1985  | Schwartz et al. |
| 4,571,157 | A |   | 2/1986  | Eickmann |
| 4,772,181 | A |   | 9/1988  | Poucher |
| 4,781,533 | A | * | 11/1988 | Andersson .............. 416/157 R |
| 4,822,243 | A |   | 4/1989  | Poucher |
| 5,042,966 | A |   | 8/1991  | Schwartz et al. |
| 5,107,676 | A |   | 4/1992  | Hadaway et al. |
| 5,141,399 | A |   | 8/1992  | Duchesneau et al. |
| 5,174,718 | A |   | 12/1992 | Lampeter et al. |
| 5,186,608 | A |   | 2/1993  | Bagge |
| 5,213,471 | A |   | 5/1993  | Miller et al. |
| 5,344,101 | A |   | 9/1994  | François |
| 5,897,293 | A |   | 4/1999  | Arel et al. |
| 6,340,290 | B1 |  | 1/2002  | Schott et al. |
| 6,422,816 | B1 |  | 7/2002  | Danielson |

FOREIGN PATENT DOCUMENTS

| EP | 0 311 277   |   | 1/1995 |            |
| JP | 52-47293 A  | * | 4/1977 | ... 416/31 |
| JP | 52-61097 A  | * | 5/1977 | ... 416/31 |

* cited by examiner

*Primary Examiner*—Christopher Verdier
(74) *Attorney, Agent, or Firm*—Ogily Renault LLP

(57) ABSTRACT

A system and method for providing pressurised oil during non-feathered in-flight shutdown conditions in a variable-pitch aircraft propeller engine. A secondary pump provides pressurised oil substantially independent of an engine main oil circuit.

22 Claims, 3 Drawing Sheets

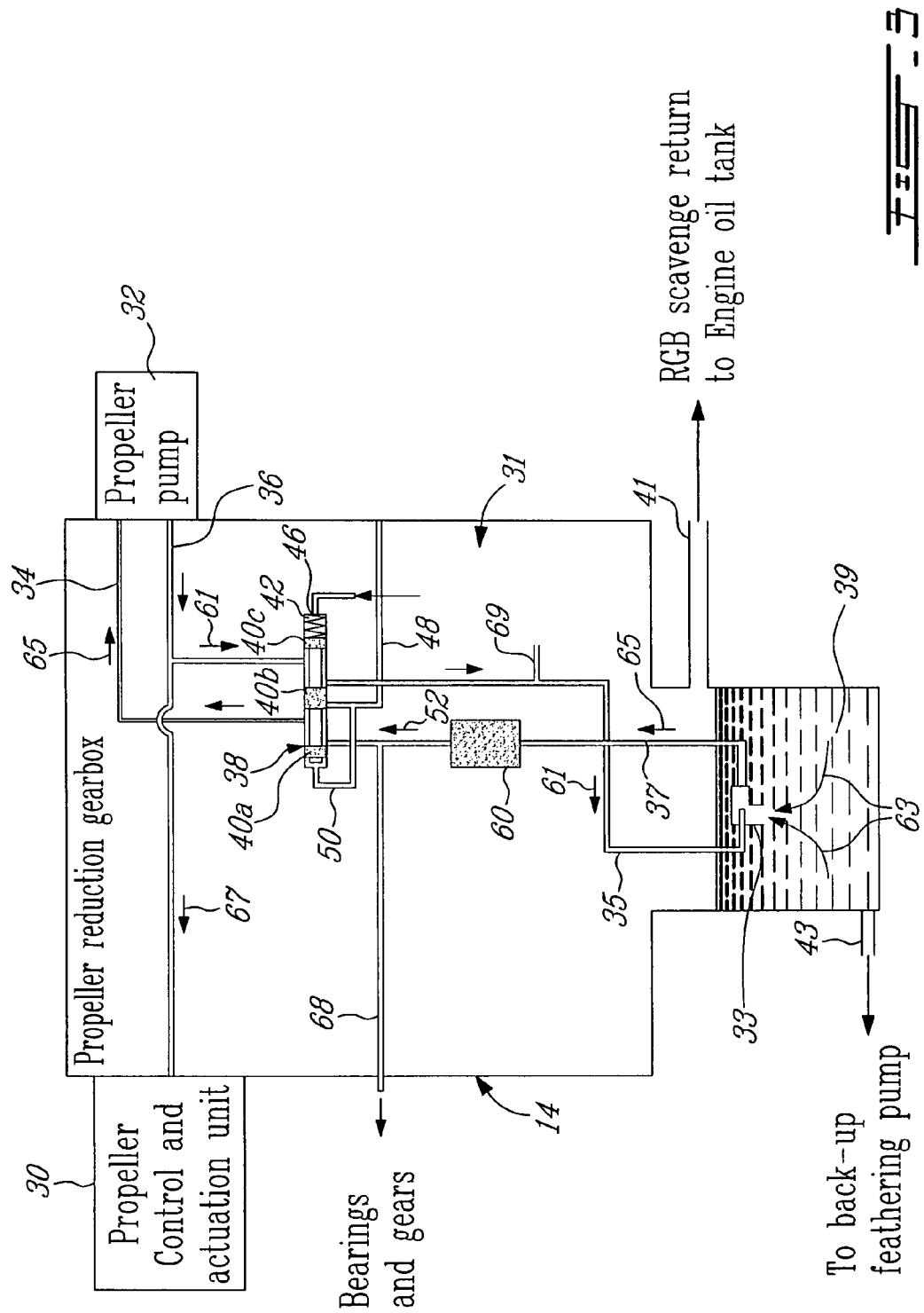

PRESSURIZED OIL SUPPLY FOR PROPELLER ENGINE SYSTEM

BACKGROUND OF THE INVENTION

1. Field of the Invention

The present invention relates to a system and method for providing pressurized oil during non-feathered in-flight shutdown conditions in a variable-pitch aircraft propeller engine.

2. Description of the Prior Art

Propeller control systems for turboprop engines normally employ pressurized oil as a means of system actuation. The source of this pressurized oil is usually from a positive displacement or other pump which is driven from the propeller reduction gearbox (RGB) of the engine. The oil supply for this pump is typically provided by the RGB lubrication system, which is sized to ensure that the oil supply requirements of the propeller pump are satisfied during normal engine operating conditions.

During in-flight engine shutdown conditions, it may be required to operate the propeller in a non-feathered or rotating condition and under these conditions it is desirable to have a functioning propeller control system.

During non-feathered operation, it may not be possible for the RGB lubrication system to maintain an adequate oil supply to the propeller pump, because during engine shutdown conditions, the engine spool driving the propeller pump is either stationary or rotating at very low speeds and, hence, unlikely to provide the required pressurized oil flow required at the propeller pump inlet. A low oil supply obviously prejudices operation of the propeller system during in-flight shutdown, non-feathered conditions, and accordingly there is a need to provide an improved manner of supply oil to the propeller system.

SUMMARY OF THE INVENTION

It is therefore an aim of the present invention to provide an improved system for supplying oil to a propeller system.

Therefore, in accordance with a general aspect of the present invention, there is provided a backup system for providing pressurised oil to a propeller control system during an in-flight shutdown of an engine, the propeller control system including a propeller pump having an outlet connected to a propeller control unit and an inlet connected to a supply of pressurised oil during engine operation, the backup system comprising a secondary pump connected to the propeller pump inlet and adapted to selectively supply said propeller pump inlet with a flow of pressurized oil during said in-flight engine shutdown.

In accordance with a further general aspect of the present invention, there is provided a system for providing a secondary pressurized oil supply to an engine during in-flight shutdown conditions, the engine having a main pressurised oil circuit comprising a main pump operational at least during regular engine operation, the system comprising a secondary oil circuit selectively connectable to the main oil circuit in the event of an engine in-flight shutdown, the secondary circuit including a secondary pump adapted to pressurise oil in the secondary circuit to a predetermined pressure at least during said in-flight shutdown conditions, the predetermined pressure exceeding a nominal oil pressure in the main pressurised oil circuit during said in-flight shutdown conditions, wherein the secondary pump is selectively connectable to an inlet of said main pump to provide a pressurised oil supply at said inlet of said main pump during in-flight shutdown conditions.

In accordance with a further general aspect of the present invention, there is provided a turboprop engine comprising a propeller having a number of variable pitch blades, a pitch control system for governing the operation of said variable pitch blades, said pitch control system employing a pressurized fluid as a means of system actuation, a propeller pump having an outlet for providing a pressurized fluid supply to said pitch control system, a main pressurized fluid source for providing a pressurized fluid supply to an inlet of said propeller pump, and a pressurized fluid back-up system for enabling operation of the pitch control system during in-flight engine shutdown conditions when said main source of pressurized fluid is unavailable, said pressurized fluid back-up system comprising a secondary source of pressurized fluid available to provide a pressurized fluid supply to said propeller pump inlet during in-flight shutdown, and a switching unit having a first state in which said main source or pressurized fluid is connected to the propeller pump inlet and said secondary source of pressurized fluid is disconnected therefrom, and a second state in which the secondary source of pressurized fluid is connected to said propeller pump inlet, while said main source of pressurized fluid is disconnected therefrom.

In accordance with a still further general aspect of the present invention, there is provided a method for providing pressurised oil during in-flight shutdown of a variable pitch propeller engine, comprising the steps of: providing a propeller pump adapted to supply pressurized oil during engine operation from a main pressurised oil circuit to a propeller pitch actuation system, and upon in-flight shutdown of the engine, selectively connecting the propeller pump to a secondary pressurized fluid circuit, the circuit including a secondary pump operable independently of operation of the engine to supply pressurised oil during said engine shutdown.

BRIEF DESCRIPTION OF THE DRAWINGS

Having thus generally described the nature of the invention, reference will now be made to the accompanying drawings, showing by way of illustration a preferred embodiment thereof, and in which:

FIG. 3 is a schematic view of the system shown in operation during an in-flight engine shutdown when the regular supply of oil from the turboprop engine lubrication system is not available.

DESCRIPTION OF THE PREFERRED EMBODIMENTS

Figure 1:
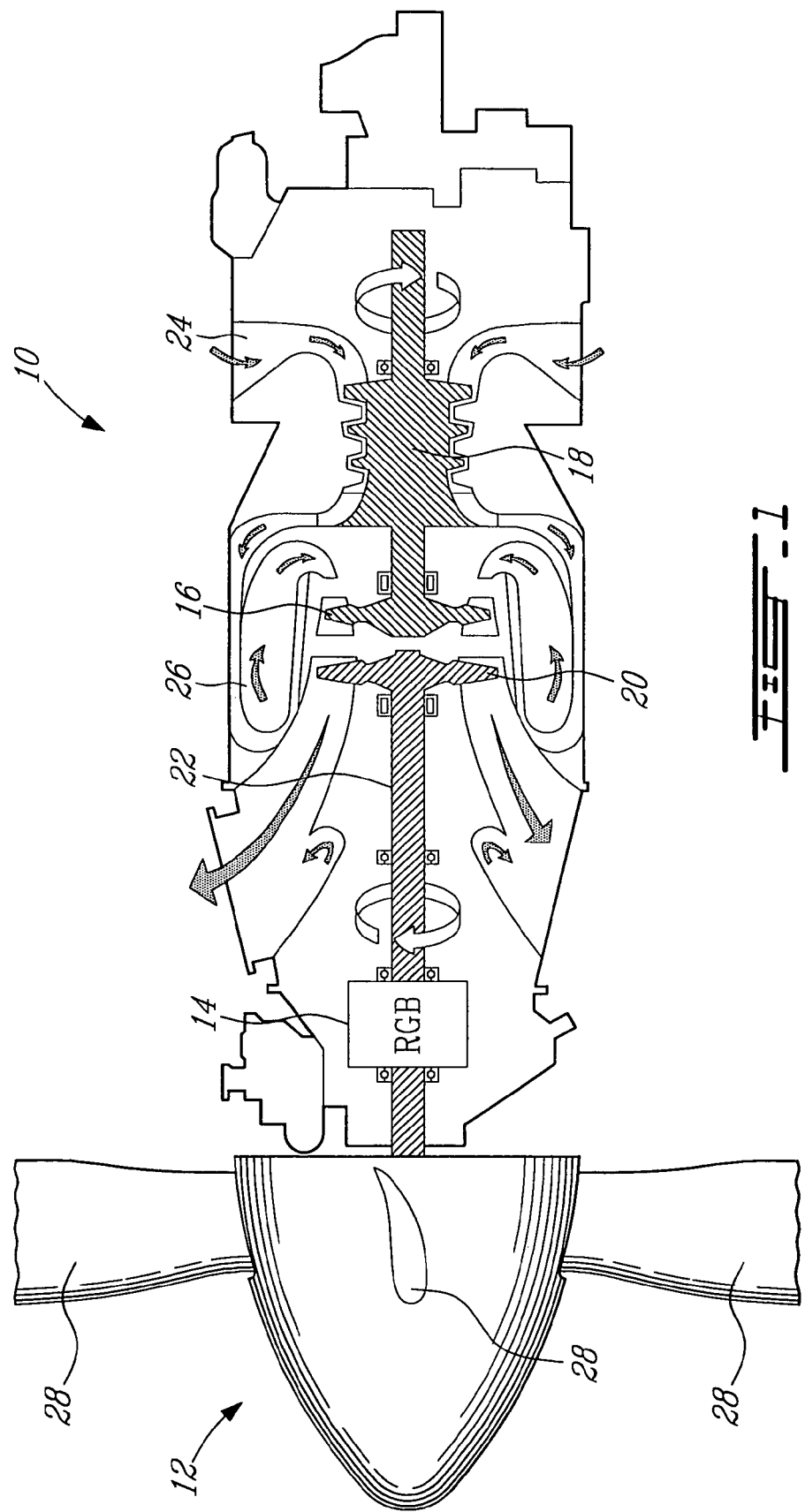
FIG. 1 is a schematic cross-sectional view of a turboprop gas turbine engine to which a preferred embodiment of the present invention is applied.

FIG. 1 illustrates a turboprop engine 10 of a type preferably provided for use in subsonic flight to drive a propeller 12 via a reduction gear box (RGB) 14. The engine 10 comprises a first rotating assembly consisting of a turbine 16 and a compressor 18, and a second rotating assembly consisting of a power turbine 20 mounted on a power turbine shaft 22. The first and second rotating assemblies are not connected together and turns at different speed and in opposite directions. This design is referred, to as a "free turbine engine". It is understood that the present invention could be applied to other types of propeller engines as well.

The compressor 18 draws air into the engine 10 via an annular plenum chamber 24, increases its pressure and delivers it to a combustor 26 where the compressed air is mixed with fuel and ignited for generating a stream of hot combustion gases. The compressor turbine 16 extracts energy from the hot expanding gases for driving the compressor 18. The hot gases leaving the compressor turbine 16 are accelerated again as they expand through the power turbine 20. The power turbine 20 provides rotational energy to drive the propeller 12. The RGB 14 reduces the power turbine 20 speed to one suitable for the propeller 12.

The propeller 12 is provided with variable pitch (angle) blades 28. A propeller control and actuator unit 30 (FIG. 2) adjusts the blade angle to maintain the propeller speed that is selected by the pilot. When more power is applied, the angle of attack of the propeller blades 28 is increased to allow the propeller 12 to absorb the additional energy without increase in propeller speed. The propeller control and actuator unit 30 can be of the type including a feather return spring and/or counterweights (not shown) for biasing the propeller blades 28 to a feather position (coarse pitch) and a servo piston (not shown) fed with pressurized oil for overcoming the coarse pitch biasing forces and, thus, displace the propeller blades 28 in a finer pitch or low blade angle position. When oil pressure is decreased, the coarse pitch biasing forces push the oil out of the servo piston and change the blade pitch to a coarser position. An increase in oil pressure, controlled by the propeller control unit 30, drives the blades 28 towards a finer pitch.

Figure 2:
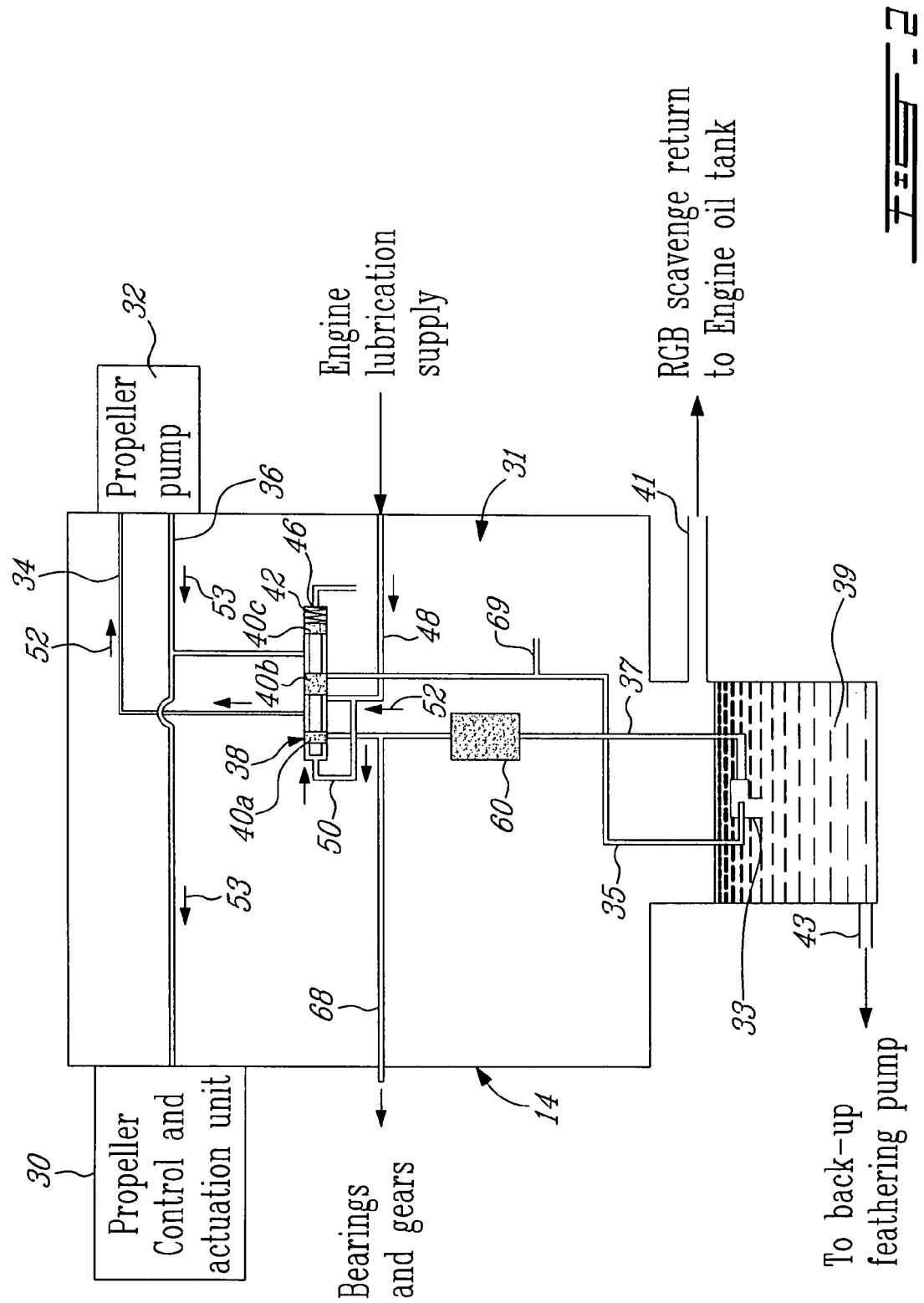
FIG. 2 is a schematic view of a system for providing a pressurized oil supply to a propeller pump in the event of an in-flight shutdown of the turboprop engine shown in FIG. 1, the system being shown in a normal engine operation state when the propeller pump is fed from the turboprop engine lubrication system.

As shown in FIG. 2, a propeller pump 32 provides the pressurized flow of oil to the propeller control and actuator unit 30 in order to actuate the propeller blades 28. The oil supply for the propeller pump 32 is typically provided by the RGB lubrication system which is, in turn, fed by the engine lubrication pump (not shown) driven by the compressor turbine 16 of the engine 10. In contrast, the propeller pump 32 is driven by the power turbine 20 via the RGB 14 and will thus still be operable in the event of in-flight engine shutdown conditions. However, under such shutdown conditions, the compressor turbine 16 is stationary or rotating at very low speed and, hence, the engine lubrication pump (not shown), which feeds the lubrication system of the RGB 14 and the propeller pump 32, is unable to maintain an adequate oil supply to the propeller pump 32 in order to provide good lubrication for non-feathered operation of the propeller blades 28.

It is herein proposed to overcome this problem by selectively connecting the propeller pump 32 to a secondary pressurized oil circuit 31 when the above-described main source of pressurized fluid is not available.

To this end, a switching mechanism, such as a multi-landed spool and sleeve valve 38, is provided to selectively connect the engine/RGB lubrication system (indicated as the engine lubrication supply in FIG. 2) or the secondary pressurized fluid circuit 31 to the propeller pump 32. As will be seen hereinafter, the valve 38 preferably has at least two states of operation, one to support normal operation of the propeller 12 with the engine running (FIG. 2) and one for supporting propeller operation when the engine is shut down (FIG. 3).

In this embodiment, the secondary circuit 31 comprises an ejector-style pump 33 having an outlet line 37 and an inlet line 35 respectively selectively connectable to the inlet line 34 and the outlet line 36 of the propeller pump 32 through valve 38. The ejector pump 33 is located in the sump 39 of the RGB 14 where, during normal conditions, the oil is picked up and returned back to the main engine oil tank (not shown) as indicated at 41. In FIGS. 2 and 3, the ejector pump 33 is shown mounted within the RGB 14 although in practice the ejector pump 33 could be located either inside or outside the RGB cavity, or other suitable location. For instance, the ejector pump 33 could function independently of the engine accessory gearbox and draw oil from a separate emergency reservoir instead of from the RGB sump 39 if desired. In the illustrated example, the RGB sump 39 is also used to provide an oil supply to a back-up feathering pump (not shown) via a feathering line 43 at the bottom of the sump 39. In this case, the inlet to the ejector pump 33 is preferably raised off the bottom of the sump 39 above the back-up feathering line 43, but below scavenge return line 41 to ensure that a sufficient quantity of oil is left within the sump 39 regardless of the ejector pump operation.

In the illustrated embodiment, the valve 38 preferably comprises three rigidly interconnected valve members 40a, 40b, 40c biased to the position shown in FIG. 3 by a compression spring 42; In addition to the biasing force exerted by the spring 42, a pressure corresponding to the RGB cavity pressure (or any other suitable low reference pressure source) is exerted on the right hand side of the valve member 40c in order to further urge the three valve members 40a, 40b and 40c to the position shown in FIG. 3. The valve member 40c is exposed to the RGB cavity pressure through port 46.

As shown in FIG. 2, under normal engine operation, the propeller pump 32 is fed by the engine/RGB lubrication system via feed line 48. A portion of the flow coming from the engine/RGB lubrication system is diverted via branch line 50 into the left hand side of the valve member 38 to exert a pushing force against the valve member 40a. During normal engine operation, the pressure of the incoming oil is greater than the combined action of the biasing force of the spring 42 and the RGB cavity pressure on the valve member 40c, thereby causing the three valve members 40a, 40b and 40c to slide to the right against the spring 42. In this position, which corresponds to the first state of the switching system, the inlet line 34 of the propeller pump 32 is connected to the feed line 48, as indicated by arrows 52.

In this first state, when the engine 10 is running, the valve members 40a and 40b respectively disconnect the inlet line 35 and the outlet line 37 of the ejector pump 33 from the outlet line 36 and the inlet line 34 of the propeller pump 32, thereby completely disconnecting the secondary circuit 31 from the propeller pump 32. The inlet of the propeller pump 32 is thus solely pressurized by the engine/RGB lubrication system and there is no flow of oil through the secondary circuit 31. The oil pumped by the propeller pump 32 is directed into the propeller control and actuation unit 30 via output line 36 as indicated by arrows 53 in FIG. 2. This provides for the operation of the variable pitch propeller blades 28.

In the event that the oil pressure in the feed line 48 drops below a predetermined value corresponding to the pressure exerted on the right hand side of the valve member 40c, the rigidly interconnected valve members 40a, 40b and 40c jointly slide to the left to the position shown in FIG. 3 under the action of the spring 42 and the RGB cavity pressure. This will occur, for example, in the event of an in-flight shutdown of the engine. In the position shown in FIG. 3, the valve member 40b disconnects the feed line 48 from the propeller pump inlet and fluid flow connection is established between 1) the ejector pump outlet line 37 and the propeller pump inlet line 34 and 2) the ejector pump inlet line 35 and the propeller pump outlet line 36.

The surplus propeller pump flow is used to operate the ejector pump 33 to pressurize the propeller pump inlet in order to support non-feathered operation of the propeller blades 28 when the regular pressurized oil supply from the engine/RGB lubrication system is not available, such as during in-flight shutdown of the engine. The flow requirements for the propeller pump 32 are generally sized for ground handling operation, particularly transients in to and out of reverse pitch. As such, during in-flight conditions, the available flow from the propeller pump 32 is considerably in excess of that required for propeller control system operation.

The motive flow 61 (i.e. the surplus propeller pump flow) from the propeller pump outlet line 36 and the ejector pump inlet line 35 causes oil in the sump 39 to be drawn into the ejector pump 33, as indicated by arrows 63. As indicated by arrows 65, the oil drawn from the sump 39 by the ejector pump 33 flows through the ejector outlet line 37 and then through the propeller pump inlet line 34, thereby ensuring a continuous pressurized supply of oil to the propeller pump inlet. A first portion 67 of the flow from the propeller pump 32 is used to operate the propeller blades 28 and the surplus of oil is returned to the ejector pump inlet to act as the motive flow 61 to continuously draw oil from the sump 39.

To minimize the clogging of the ejector pump 33, the components of the propeller actuation system (30, 32) and the secondary circuit components resulting from contaminant residing in the sump oil, it is recommended that a filter or strainer 60 be mounted in one of the line of the secondary circuit 31, preferably in line 35 and preferably upstream of the above components.

As indicated at 68 and 69, it is also contemplated to use the surplus oil flow from the ejector pump 33 and/or the propeller pump 32 (in excess to that required to satisfy the propeller control and actuation unit) for any other suitable purpose, such as to provide back-up lubrication to critical propeller reduction gearbox gears and bearings or other components which are rotating during engine shutdown/propeller windmilling mode or to provide a oil heating source during high altitude operation where outside air temperatures are very low. This is particularly useful for propeller windmilling for extended periods that may be undertaken to maximize the range of aircraft with one or more engines inoperative.

The above-described invention is advantageous in that it provides for a continued supply of pressurized oil which may be used, for example, in the non-feathered operation of the propeller blades 28 during in-flight shutdown or during other situations when the regular oil supply is unavailable. Non-feathered operation of the propeller blades 28 during in-flight shutdowns advantageously permits to reduce the induced drag on the aircraft or to allow the operation of accessories mounted on accessory drives of the RGB 14. A continuing supply of pressurized oil permits continued operation of certain engine subsystems despite the inoperative status of the engine.

The embodiments of the invention described above are intended to be exemplary. Those skilled in the art will therefore appreciate that the forgoing description is illustrative only, and that various alternatives and modifications can be devised without departing from the spirit of the present invention. Accordingly, the present is intended to embrace all such alternatives, modifications and variances which fall within the scope of the appended claims. For instance, although the above-described switching mechanism changes state based on engine oil pressure, it is understood that a similar parameter indicative of the operational status of the engine, such as engine fluid pressure, fuel pressure, shaft rotation speed, interturbine temperature, etc., could also be used to automatically actuate the switching mechanism, or manual switching may also be provided. Also, the ejector pump could be replaced by any suitable passive pump or active pump or pump-like device, such as a centrifugal pump or a gear pump. The term "passive pump" is herein intended to encompass any pump which does not require to be driven off from a driving source in order to pump a fluid. The term "active pump" is herein intended to means any pump which must be connected to a driving source to be operative. A passive pump is preferred due to its ability to operate without an external supply of mechanical or electric power. If an active pump is used, it is preferably driven from the windmilling propeller shaft or another non-engine direct power source, such as an electric motor driven pump or hydraulic motor driven pump, in order to be self-sufficiently operative during the engine shutdown condition. The second pump may be located in any suitable location. Other sources of pressurized fluid (e.g. fuel) may be used to actuate control system for the propeller blades 28. The invention is also not limited in application to a propeller engine, but may be applied to any engine which windmills in an in-flight shutdown condition. Still other modifications will be apparent to the skilled reader, and therefore within the scope of the attached claims.

What is claimed is:

1. A backup system for providing pressurised oil to a propeller control system during an in-flight shutdown of an engine, the propeller control system including an oil circuit normally fed by a propeller pump having an outlet connected to a propeller control unit and an inlet connected to a supply of pressurised oil during engine operation, the backup system comprising a secondary pump selectively connectable to said oil circuit and adapted to selectively supply said oil circuit with a flow of pressurized oil during said in-flight engine shutdown, the secondary pump including an ejector pump having an ejector pump inlet and an injector pump outlet selectively connectable in fluid flow communication with said oil circuit, the oil in the oil circuit being used as a motive fluid for the ejector pump to passively draw additional oil in the oil circuit.

2. A system as defined in claim 1, wherein said ejector pump inlet and said ejector pump outlet are respectively connected to said propeller pump outlet and said propeller pump inlet to selectively communicate with said propeller pump outlet and said propeller pump inlet upon said in-flight shutdown, and wherein the propeller pump provides the motive fluid to drive the ejector pump.

3. A system as defined in claim 2, wherein said ejector pump is adapted to draw oil from a sump of a propeller reduction gear box.

4. A system as defined in claim 1, further comprising a switching unit adapted to selectively permit fluid communication between the propeller pump and the secondary pump.

5. A system as defined in claim 4, wherein said switching unit includes a valve which is responsive to a parameter indicative of an operational status of the engine, and wherein the valve is automatically switched to connect the outlet of the secondary pump to the propeller pump inlet during said in-flight engine shutdown.

6. A system as defined in claim 5, wherein said valve is responsive to fluid pressure at the inlet of the propeller pump for connecting said secondary pump to the inlet of the propeller pump when fluid pressure at the inlet of the propeller pump is below a predetermined value indicative of said n-flight engine shutdown.

7. A system for providing a secondary pressurized oil supply to an engine during in-flight shutdown conditions, the engine having a main pressurised oil circuit comprising a main pump operational at least during regular engine operation, the system comprising a secondary oil circuit selectively connectable to the main oil circuit in the event of an engine in-flight shutdown, the secondary circuit including a secondary pump adapted to pressurise oil in the secondary circuit to a predetermined pressure at least during said in-flight shutdown conditions, the predetermined pressure exceeding a nominal oil pressure in the main pressurised oil circuit during said in-flight shutdown conditions, wherein the secondary pump is selectively connectable to an inlet of said main pump to provide a pressurised oil supply at said inlet of said main pump during said in-flight shutdown conditions, and wherein said secondary pump comprises an ejector pump having an ejector pump inlet and an ejector pump outlet, said ejector pump inlet and said ejector pump outlet being respectively connected in selective fluid flow communication with an outlet and an inlet of the main pump.

8. A system as defined in claim 7, wherein said main pump is a propeller pump having an outlet connected to a propeller control system.

9. A system as defiled in claim 8, wherein said ejector pump is adapted to pump oil from a sump to feed said propeller pump inlet using surplus oil pumped by the propeller pump as a motive fluid.

10. A system as defined in clam 9, wherein said sump is located in a propeller reduction gear box, and wherein said ejector pump is located at a lower level than a scavenge return line of said sump.

11. A system as defined in claim 7, wherein said secondary circuit includes a switching unit adapted to automatically connect the secondary circuit to the main oil circuit upon the occurrence of the in-flight shutdown condition.

12. A system as defined in claim 11, wherein said switching unit includes a valve which is responsive to a parameter indicative of an operational status of the engine, and wherein the parameter is selected from a group comprising: an oil pressure, an engine fluid pressure, an engine shaft rotational speed, an engine temperature and a manually-operated switch.

13. A system as defined in claim 12, wherein said valve is responsive to the oil pressure in said main circuit to disconnect said main circuit from said inlet of said main pump and to connect said secondary circuit to said inlet of said main pump when the oil pressure in the main circuit is below a predetermined value.

14. A turboprop engine comprising a propeller having a number of variable pitch blades, a pitch control system for governing the operation of said variable pitch blades, said pitch control system employing a pressurized fluid as a means of system actuation, a propeller pump having an outlet for providing a pressurized fluid supply to said pitch control system, a main pressurized fluid source for providing a pressurized fluid supply to an inlet of said propeller pump, and a pressurized fluid back-up system for enabling operation of the pitch control system during in-flight engine shutdown conditions when said main source of pressurized fluid is unavailable, said pressurized fluid back-up system comprising a secondary source of pressurized fluid available to provide a pressurized fluid supply to said propeller pump inlet during in-flight shutdown, and a switching unit having a first state in which said main source of pressurized fluid is connected to the propeller pump inlet and said secondary source of pressurized fluid is disconnected from the propeller pump inlet, and a second state in which the secondary source of pressurized fluid is connected, to said propeller pump inlet, while said main source of pressurized fluid, is disconnected from the propeller pump inlet, said secondary source of pressurized fluid comprises a passive pump driven by surplus fluid supplied by said propeller pump.

15. A turboprop engine as defined in claim 14, wherein said turboprop engine comprises a turbine, and wherein said main SOURCE of pressurized fluid comprises a first pump, said first pump being driven by said turbine.

16. A turboprop engine as defined in claim 14, wherein said passive pump is an ejector pump connected in a loop circuit with said propeller pump, and thereby driven by surplus oil pumped by said propeller pump.

17. A turboprop engine as defined in claim 16, wherein said ejector pump pumps oil from a sump of a reduction gear box.

18. A turboprop engine as defined in claim 14, wherein said switching unit includes a valve which is responsive to a parameter indicative of the fluid pressure of said main source of pressurized fluid.

19. A turboprop engine as defined in claim 18, wherein said valve is responsive to the fluid pressure of said main source to disconnect said main source from said propeller pump inlet and connect said secondary source thereto when the fluid pressure of the main source is below a predetermined value.

20. A method for providing pressurised oil during in-flight shutdown of a variable pitch propeller engine, comprising the steps of: a) providing a propeller pump adapted to supply pressurized oil during engine operation from a main pressurised oil circuit to a propeller pitch actuation system, upon in-flight shutdown of the engine, b) selectively connecting the propeller pump to a secondary pressurized fluid circuit, the circuit including a an ejector pump operable independently of operation of the engine to supply pressurised oil during said engine shutdown and c) using surplus propeller pump flow as a motive fluid to operate the ejector pump.

21. The method of claim 20 wherein the method further comprises the step of connecting an outlet of the ejector pump to an inlet of the propeller pump, and wherein the step of selectively connecting further comprises selectively connecting an outlet of the propeller pump to an inlet of the ejector pump.

22. A backup system for providing pressurised oil to a propeller control system during an in-flight shutdown of an engine, the propeller control system including a propeller pump having an outlet connected to a propeller control unit and an inlet connected to a supply of pressurised oil during engine operation, the backup system comprising a secondary pump connected to the propeller pump inlet and adapted to selectively supply said propeller pump inlet with a flow of pressurized oil during said in-flight engine shutdown, wherein said valve is responsive to fluid pressure at the inlet of the propeller pump for connecting said secondary pump to the inlet of the propeller pump when fluid pressure at the inlet of the propeller pump is below a predetermined value indicative of said in-flight engine shutdown.

* * * * *

UNITED STATES PATENT AND TRADEMARK OFFICE
CERTIFICATE OF CORRECTION

PATENT NO. : 7,118,336 B2 Page 1 of 1
APPLICATION NO. : 10/739951
DATED : October 10, 2006
INVENTOR(S) : David Waddleton It is certified that error appears in the above-identified patent and that said Letters Patent is hereby corrected as shown below:

Column 7, line 6, delete "n-flight" and insert --in-flight--
Column 7, line 30, delete "defiled" and insert --defined--

Signed and Sealed this

Nineteenth Day of December, 2006

JON W. DUDAS
*Director of the United States Patent and Trademark Office*